US010942530B2

(12) United States Patent
Anderson et al.

(10) Patent No.: US 10,942,530 B2
(45) Date of Patent: *Mar. 9, 2021

(54) WEATHER BASED OBJECT PROTECTION USING DRONES

(71) Applicant: International Business Machines Corporation, Armonk, NY (US)

(72) Inventors: Evelyn R. Anderson, Houston, TX (US); Michael Bender, Rye Brook, NY (US); Rhonda L. Childress, Austin, TX (US); Ea-Ee Jan, Westchester, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,612

(22) Filed: Apr. 17, 2019

(65) Prior Publication Data

US 2019/0243365 A1 Aug. 8, 2019

Related U.S. Application Data

(63) Continuation of application No. 15/626,547, filed on Jun. 19, 2017, now Pat. No. 10,606,267.

(51) Int. Cl.
*G05D 1/10* (2006.01)
*G05D 1/00* (2006.01)
(Continued)

(52) U.S. Cl.
CPC ........... *G05D 1/106* (2019.05); *B64C 39/024* (2013.01); *B64D 47/08* (2013.01); *G05D 1/0027* (2013.01);
(Continued)

(58) Field of Classification Search
CPC .. G05D 1/0088; G05D 1/0027; B64C 39/024; B64C 2201/128; B64C 2201/141; B64C 2201/146; B64D 7/08
See application file for complete search history.

(56) References Cited

U.S. PATENT DOCUMENTS 4,940,927 A 7/1990 Fisher
5,341,540 A 8/1994 Soupert
(Continued)

FOREIGN PATENT DOCUMENTS

CN 104216403 A 12/2014
JP 2017210078 A 11/2017

OTHER PUBLICATIONS

Anderson et al., "Weather Based Object Protection Using Drones", U.S. Appl. No. 15/626,547, filed Jun. 19, 2017.
(Continued)

*Primary Examiner* — Dale W Hilgendorf
(74) *Attorney, Agent, or Firm* — Andrew Aubert

(57) ABSTRACT

A tool for protecting outdoor objects from weather related damage. Responsive to a registration request, the tool registers an object and an originating location where the object is currently located. The tool determines whether a risk threshold for the object is exceeded based, at least in part, on weather conditions at the originating location. Responsive to a determination that the risk threshold for the object is exceeded, the tool instructs one or more drones to relocate the object from an originating location to a protected location that is protected from the weather conditions.

1 Claim, 3 Drawing Sheets

(51) Int. Cl.
  *B64C 39/02* (2006.01)
  *B64D 47/08* (2006.01)
(52) U.S. Cl.
  CPC ......... *G05D 1/0088* (2013.01); *G05D 1/1062* (2019.05); *B64C 2201/128* (2013.01); *B64C 2201/141* (2013.01); *B64C 2201/146* (2013.01); *G05D 1/101* (2013.01)

(56) References Cited

U.S. PATENT DOCUMENTS

| | | | |
|---|---|---|---|
| 5,940,927 | A | 8/1999 | Haegermarck |
| 6,364,026 | B1 | 4/2002 | Doshay |
| 8,831,284 | B2 | 9/2014 | Thueux |
| 9,305,280 | B1 | 4/2016 | Berg |
| 9,382,747 | B1 | 7/2016 | Anderson |
| 9,387,928 | B1 * | 7/2016 | Gentry et al. |
| 9,420,741 | B2 | 8/2016 | Balutis |
| 9,483,933 | B1 | 11/2016 | Anderson |
| 9,665,094 | B1 | 5/2017 | Russell |
| 9,841,761 | B2 | 12/2017 | Shehata |
| 9,915,945 | B2 | 3/2018 | Fox |
| 9,959,771 | B1 | 5/2018 | Carlson |
| 10,000,284 | B1 * | 6/2018 | Purwin et al. ........ B64C 39/024 |
| 10,005,556 | B2 | 6/2018 | Rastgaar Aagaah et al. |
| 10,606,267 | B2 * | 3/2020 | Anderson et al. ... G05D 1/0088 |
| 2004/0068351 | A1 | 4/2004 | Solomon |
| 2006/0249622 | A1 | 11/2006 | Steele |
| 2007/0187042 | A1 | 8/2007 | Kallstrom |
| 2013/0035774 | A1 | 2/2013 | Warren |
| 2016/0340006 | A1 | 11/2016 | Tang |
| 2017/0144756 | A1 | 5/2017 | Rastgaar Aagaah |
| 2017/0199044 | A1 | 7/2017 | Hoareau |
| 2017/0278406 | A1 | 9/2017 | Akselrod et al. |
| 2018/0033320 | A1 | 2/2018 | Castelli |
| 2018/0038993 | A1 | 2/2018 | Jaegenstedt |
| 2018/0136093 | A1 | 5/2018 | Avakov |
| 2018/0364714 | A1 * | 12/2018 | Anderson et al. ... G05D 1/0088 |

OTHER PUBLICATIONS

Anderson et al., "Weather Based Object Protection Using Drones", U.S. Appl. No. 15/850,408, filed Dec. 21, 2017.
List of IBM Patents or Patent Applications Treated as Related, Filed Apr. 17, 2019, 2 pages.

* cited by examiner

WEATHER BASED OBJECT PROTECTION USING DRONES

BACKGROUND OF THE INVENTION

The present invention relates generally to the field of automated services, and more particularly to safeguarding objects from weather.

Drones come in multiple varieties. Some of these drones roll and walk over terrain while others fly through the sky via propellers and rotors, such as quadcopter drones. Many drones are electrically powered through rechargeable battery packs mounted to the drones. Specialized equipment can be mounted on drones such as video cameras, robotic grasping claws, hooks, fire suppressant distribution systems, enabling many useful applications such as fighting forest fires, capturing video footage, or delivering packages. Drones may also come equipped with elements of a computer including processors, memory, and wireless network adapters. Equipped computer elements enable drones to communicate with other networked computers and drones to perform coordinated tasks, such as joint flight maneuvers, or to fly without manual-human control directing the movement of a drone.

State of the art computing techniques enable what is known as computer image processing, where algorithms analyze image data to identify and categorize objects in captured images and video. Examples of this include face identification in digital cameras, security retinal scanners, superimposed graphics on smartphone photography applications, and other augmented reality technologies. Each of the above examples identify useful information within visual data.

SUMMARY

Aspects of an embodiment of the present invention disclose a method, a computer program product, and a computer system for controlling robotic devices to transport objects based, at least in part, on various weather conditions. Responsive to receiving a registration request, the method includes registering, by one or more computer processors, an object and an originating location where the object is currently located. The method includes determining, by the one or more computer processors, whether a risk threshold for the object is exceeded based, at least in part, on a plurality of weather conditions at the originating location. Responsive to a determination that the risk threshold for the object is exceeded, the method includes instructing, by the one or more computer processors, one or more drones to move the object from the originating location to a protected location that is protected from the weather conditions.

According to an aspect of the present invention, there is a method, computer program product and/or system for transporting objects responsive to weather data that performs the following operations (not necessarily in the following order): (i) responsive to receiving a registration request, registering, by one or more computer processors, an object and an originating location where the object is currently located; (ii) monitoring, by the one or more computer processors, a plurality of weather conditions at the originating location; (iii) determining, by the one or more computer processors, that a risk threshold for the object is exceeded based, at least in part, on a plurality of weather conditions at the originating location and on a plurality of weather condition information for a plurality of similar objects; (iv) responsive to the determination that the risk threshold for the object is exceeded, instructing, by the one or more computer processors, one or more drones to transport the object from the originating location to a protected location that is protected from the weather conditions; (v) actuating, the one or more drones to transport the object from the originating location to the protected location in accordance with the instructions; (vi) determining, by the one or more computer processors, that the risk threshold for the object is no longer exceeded based, at least in part, on changes in the plurality of weather conditions indicating an abatement of weather conditions that exceeded the risk threshold for the object; (vii) responsive to a determination that the risk threshold for the object is not exceeded, instructing, by the one or more computer processors, the one or more drones to move the object from the protected location to the originating location; and (viii) updating, by the one or more computer processors, a risk assessment for the object, based, at least in part, on a damage profile of the object. Wherein the instructing one or more drones to move the object from an originating location to a protected location further comprises: (i) instructing, by the one or more computer processors, the one or more drones to deploy to the originating location; and (ii) identifying, by the one or more computer processors, the object at the originating location. Wherein the identifying the object at the originating location further comprises instructing, by the one or more computer processors, the one or more drones to search near the originating location to locate the object.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
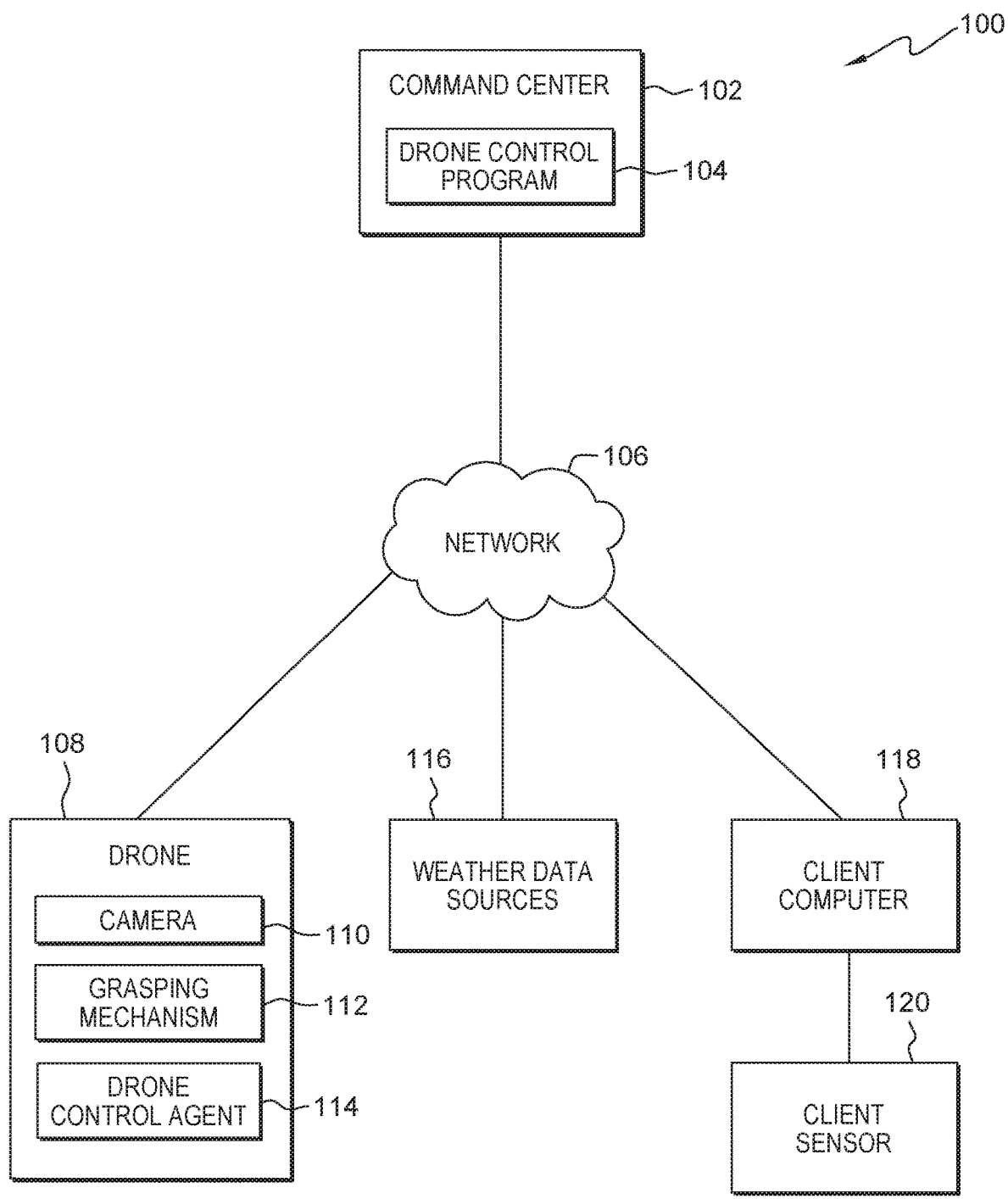
FIG. 1 is a functional block diagram illustrating an autonomous drone control environment, in accordance with an embodiment of the present invention.

FIG. 1 is a functional block diagram illustrating an autonomous drone control environment, generally designated 100, in accordance with one embodiment of the present invention. The term "autonomous" as used in this specification describes the operation of remote robotic devices with little to no human intervention during operation. The term "drone" as used in this specification refers to unmanned aerial vehicles, airborne drone devices such as a "quadcopter," and ground based robotic devices operated by wireless networked communications. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. FIG. 1 includes command center 102, network 106, drone 108, weather data sources 116, client computer 118, and client sensor 120.

In one embodiment, command center 102 is a networked computer, and may be, for example, a server computer, a desktop computer, a laptop computer, a tablet computer, a smart phone, a personal digital assistant (PDA), a thin client or any other electronic device or computing system capable of communicating with drone 108, weather data sources 116, and client computer 118. For example, client computer 118 might be a desktop computer capable of connecting to a network, such as network 106, to submit one or more registration requests to drone control program 104 located in the memory of command center 102, which might be a server computer connected to client computer 118 through a network, such as network 106.

In one embodiment, drone control program 104 is a software program stored within command center 102. In one embodiment, drone control program 104 maintains a list of registered objects to protect from predicted damaging weather conditions. In one embodiment, drone control program 104 receives a registered object profile from client computer 118, where received registered object profile may include images of an object, weight of the object, volume of the object defined by a length, width and height dimension, a list of weather condition information including a type and severity of weather conditions likely to damage the object, acceptable percentage chance of a weather condition occurring before drone control program engages protection measures for the object, comparable objects that would likely sustain damage during similar weather conditions, a storage location for the object, an originating location for the object, and how soon protection measures should be engaged before an impending weather condition likely occurs. In one embodiment, where drone control program 104 has a list of weather condition information for one or more comparable objects, drone control program 104 determines a breakability score for various weather conditions measuring how likely a registered object is to break during a weather event by comparing a list of weather event information for the object and a list of weather event information for one or more comparable objects. In one embodiment, drone control program 104 generates a list of weather condition information for one or more comparable objects by monitoring external data sources for reports of damage of comparable objects and recorded weather conditions at a date and time of a report. In one embodiment, drone control program 104 monitors weather data sources 116 over network 106 for weather condition data at an originating location. In one embodiment, drone control program 104 determines whether monitored weather condition data indicates the registered object requires protection from a weather condition. In one embodiment, drone control program 104 dispatches drones to identify the registered object and confirm presence of the registered object at the originating location. In one embodiment, drone control program 104 dispatches drones to confirm a location and storage capacity of a storage location. A storage location (also sometimes herein referred to as a "protected location") is any that: (i) is sized and shaped to be capable of accommodating an associated object; (ii) is accessible to be entered by the object when being transported by drones; and (iii) is reasonably likely to protect the object from undue wear or damage due to weather conditions likely to be encountered in vicinity of the object's originating location. In one embodiment, drone control program 104 determines a number and type of drones to relocate the registered object to the storage location. In one embodiment, drone control program 104 instructs a drone to relocate the registered object to the storage location. In another embodiment, drone control program 104 instructs a plurality of drones to relocate the registered object to the storage location. In one embodiment, drone control program 104 monitors weather data sources 116 over network 106 for weather condition data indicating an abatement of weather events matching one or more breakability scores for the registered object. In one embodiment, responsive to monitored weather condition data indicating an abatement of damaging weather conditions at the originating location and the storage location, drone control program 104 relocates the registered object from the storage location to the originating location. In one embodiment, drone control program 104 may retain the registered object at the storage location for a pre-defined period of time. In one embodiment, drone control program 104 updates an analysis regarding whether a weather condition induces damage to the registered object by recording weather condition data for a weather condition and whether the registered object sustained damage during the weather condition.

In one embodiment, network 106 is the Internet representing a worldwide collection of networks and gateways that use TCP/IP protocols to communicate with one another. Network 106 may include wire cables, wireless communication links, fiber optic cables, routers, switches and/or firewalls. Command center 102, drone 108, weather data sources 116, client computer 118, and client sensor 120 are interconnected by network 106. Network 106 can be any combination of connections and protocols capable of supporting communications between command center 102, drone 108, weather data sources 116, and client computer 118. Network 106 may also be implemented as a number of different types of networks, such as an intranet, a local area network (LAN), a virtual local area network (VLAN), or a wide area network (WAN). In another embodiment, network 106 may rely on transmitting and receiving radio waves for communication between command center 102 and drone 108. In another embodiment, a network such as network 106 supports communications between client computer 118 and client sensor 120. FIG. 1 is intended as an example and not as an architectural limitation for the different embodiments.

In one embodiment, drone 108 is a quadcopter drone including a camera, an object grasping mechanism, and a drone control agent. In one embodiment, drone 108 may represent a plurality of drones connected to command center 102 through network 106. In one embodiment, drone 108 may represent a plurality of different autonomous robotic vehicles including ground and aerial varieties. In one embodiment, drone 108 includes weather sensors for measuring local weather conditions. For example, where drone 108 includes weather sensors, drone 108 records atmospheric pressure, temperature and humidity to memory in drone control agent 114 for transmission to command center 102. In one embodiment, drone 108 includes camera 110, grasping mechanism 112, and drone control agent 114.

In one embodiment, camera 110 may be a video recording device operationally connected to drone 108. In one embodiment, camera 110 is a camera configured to record a continuous video stream. In one embodiment, camera 110 records video data in the IR spectrum.

In one embodiment, grasping mechanism 112 may be a rubberized hook. In one embodiment, grasping mechanism 112 may be a motorized robotic claw capable of opening and closing to grasp objects of varying shapes and sizes.

In one embodiment, drone control agent 114 is a software program that interfaces drone hardware with a drone control program. In one embodiment, drone control agent 114 includes firmware program instructions for operating drone 108. In one embodiment, drone control agent 114 includes program instructions for operating drone 108 responsive to instructions from command center 102. For example, where command center 102 instructs drone 108 to fly from a home location to a target location and drone 108 is a quadcopter drone, drone control agent 114 operates the rotors of drone 108 to move drone 108 to the target location. In one embodiment, drone control agent 114 operates drone 108 in a coordinated manner with one or more drones, such as drone 108, to transport a registered object with a mass greater than what an individual drone 108 can lift. For example, where drone 108 is a quadcopter drone capable of lifting objects weighing up to 25 pounds, and a registered object weighs 40 pounds, in one embodiment two drones 108 jointly grasp the registered object and cooperatively transport the registered object to a safe location. In one embodiment, drone control agent 114 transmits registered object data to command center 102 through network 106. In one embodiment, drone control agent 114 transmits weather condition data to command center 102. In one embodiment, responsive to not locating a registered object at a designated location, drone control agent 114 operates drone 108 to search for the registered object near the designated location.

In one embodiment, weather data sources 116 includes a computing system connected to command center 102 and may be, for example, a server computer, a desktop computer, a laptop computer, a tablet computer, a smart phone, a personal digital assistant, a thin client or any other electronic device or computing system capable of analyzing raw weather data and outputting weather condition predictions based on current and historical weather data. In one embodiment, weather data sources 116 includes packaged weather information from a weather service that includes a type and severity of a weather condition predicted to occur, what time the weather condition is predicted to begin, a percentage of confidence in the weather condition occurring, and a time when the weather condition is expected to cease. Types of weather conditions can include rain, snow, hail, wind, and lightning, as well as more severe weather conditions such as floods, tornadoes, and hurricanes.

In one embodiment, client computer 118 is a client connected to command center 102 and may be, for example, a server computer, a desktop computer, a laptop computer, a tablet computer, a smart phone, a personal digital assistant (PDA), a thin client or any other electronic device or computing system capable of communicating with command center 102. For example, client computer 118 might be a desktop computer capable of connecting to a network, such as network 106, to submit one or more object registration requests to drone control program 104, in the memory of command center 102.

In one embodiment, client sensor 120 may be a motion detector, a video camera, or a GPS transmitter. In another embodiment, client sensor 120 may communicate with command center 102 through network 106. In another embodiment, client sensor 120 may communicate with drone 108 through network 106.

Figure 2:
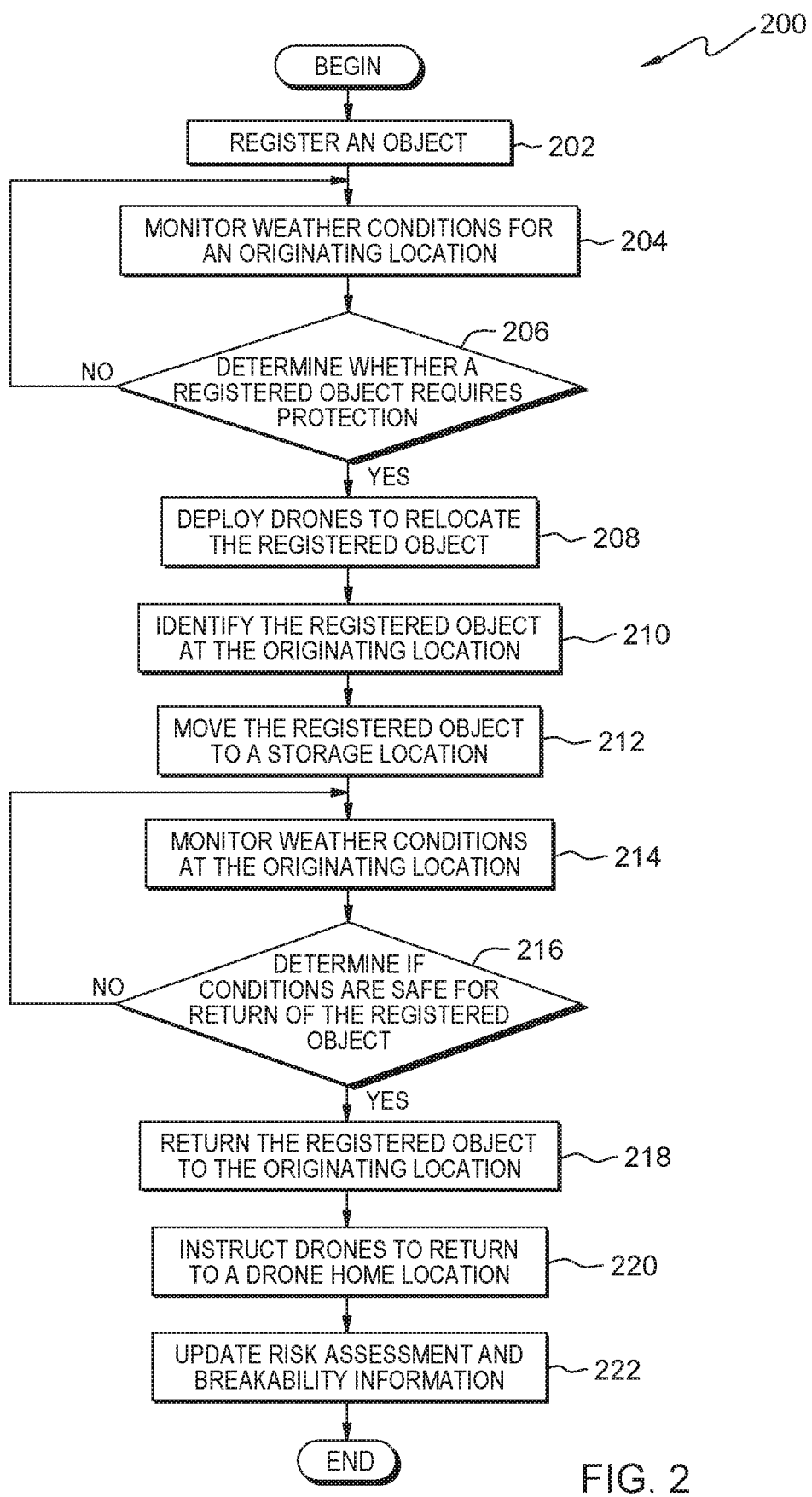
FIG. 2 is a flowchart depicting operational steps of a drone control program, on a computer within the autonomous drone control environment of FIG. 1, for controlling robotic devices to transport objects, in accordance with an embodiment of the present invention.

FIG. 2 depicts a flowchart of operational steps of an autonomous drone control program, such as drone control program 104 of FIG. 1, generally designated 200, for operating one or more drones, such as drone 108, to transport objects to a safe location responsive to weather conditions, in accordance with an embodiment of the present invention.

Drone control program 104 registers an object (202). In one embodiment, responsive to receiving a registration request for an object, drone control program 104 registers the object. In one embodiment, the registration request includes identifying information for the object, a weight measurement of an object, a volume measurement of the object defined by a length, width and height, a list of weather condition information including type and severity of one or more weather conditions, comparable objects, accepted risk threshold, timing of relocation, and ordered preferred storage locations. In one embodiment, identifying information for the object may include one or more images of the object or an RFID signature of the object. In one embodiment, where drone control program 104 receives a registration request including a list of weather condition information, the list of weather condition information includes entries for one or more weather conditions including a type and severity of a weather condition. In one embodiment, an accepted risk threshold is a pre-defined percentage threshold value representing an accepted chance of occurrence of a weather condition capable of damaging the object. For example, where drone control program 104 receives a registration request including a list of weather condition information, the list of weather condition information includes an entry that includes wind as a type of weather condition and twenty miles per hour as a measure of severity of a weather condition before an object sustains damage from a weather condition. In an additional example, a list of weather condition information includes an entry for rain as a type of weather condition and one inch per hour as a measure of severity. In one embodiment, drone control program 104 defines an originating location as a location where a registered object typically resides and a storage location as a location where drone control program 104 stores an object. In one embodiment, responsive to receiving a registration request, drone control program 104 creates a registered object profile including information received in the registration request. In one embodiment, drone control program 104 creates one or more breakability scores from the list of weather condition information for a registered object. In another embodiment, drone control program 104 creates one or more breakability scores for the registered object by comparing the list of weather condition information for the registered object to a list of weather condition information for one or more comparable objects. In one embodiment, a breakability score includes an accepted risk threshold for a weather condition that, when exceeded, indicates that drone control program 104 should initiate protection measures for the registered object. For example, where an object registration request includes information that an accepted risk threshold is twenty percent and wind speeds exceeding ten miles per hour will damage an object, drone control program 104 creates a breakability score for the object for a wind event including a twenty percent accepted risk threshold and wind speeds greater than or equal to ten miles per hour, indicating that when a weather condition meets both conditions, drone control program should implement protection for the object. In another example, where an object in a registration request is a patio umbrella and a registration request identifies ten similar patio umbrellas, drone control program 104 compares a list of weather condition information in a registration request with lists of weather condition information for each identified similar umbrella. In another embodiment, drone control program 104 averages two or more lists of weather conditions of comparable objects. In yet another embodiment, responsive to receiving a registration request, drone control program 104 monitors external data sources over network 106 for comparable objects to supplement information supplied in the registration request. For example, drone control program 104 queries social media for reported damage of comparable objects and weather conditions at a location, date and time around the reported damage. In one embodiment, drone control program 104 determines similar objects to the object from properties of the object provided in the registration request including weight, size, name of the object, and materials of composition. In another embodiment, drone control program 104 determines properties of the object by performing image analysis on an image of the object provided in the registration request.

Drone control program 104 monitors weather conditions for an originating location (204). In one embodiment, drone control program 104 monitors future weather conditions for the originating location of the registered object. In one embodiment, future weather conditions includes information on an estimated start and end time of a weather condition, a percentage chance of the weather event condition, ambient air temperature, type of precipitation, rate of precipitation, expected accumulation, wind speed, whether lightning is possible, and whether a severe weather condition can occur, such as a flood, tornado, or hurricane. For example, drone control program 104 requests from weather data sources 116 an hourly weather forecast including weather condition information for a twelve-hour window for an originating location and receives a forecast for each hour numbered t0 through t7, where t0 through t3 indicate a one hundred percent chance of clear skies and an eighty percent chance of wind speeds of up to ten miles per hour, and t4 through t7 indicate a one hundred percent chance of clear skies and a thirty percent chance of wind speeds of up to 20 miles per hour.

Drone control program 104 determines whether a registered object requires protection (206). In one embodiment, drone control program 104 determines whether the registered object requires protection by determining whether monitored weather conditions indicate a significant chance of a damaging weather condition occurring at the originating location of the object. A damaging weather condition is a weather condition capable of damaging the registered object. In one embodiment, drone control program 104 determines whether the registered object needs protection by comparing a percentage chance of a damaging weather condition occurring to an accepted risk level received with the registered object registration information. For example, where a registration request for a registered object included an accepted risk level of twenty percent, a breakability score for the registered object includes twenty miles per hour wind speeds, indicating twenty mile per hour wind speeds as a damaging weather event, and monitored weather conditions indicate a thirty percent chance of wind speeds exceeding twenty miles per hour in the next eight hours, drone control program 104 determines that the registered object requires protection.

Responsive to a determination that a registered object does not require protection (NO branch, 206), drone control program 104 continues monitoring weather conditions at the originating location (204). In one embodiment, where a percentage chance of a damaging weather condition occurring does not meet an accepted risk level associated with the registered object, drone control program 104 determines that the registered object does not need protection from the damaging weather condition. For example, where a registered object will likely sustain damage by winds exceeding twenty miles per hour, and monitored weather conditions indicate a less than ten percent chance of winds exceeding ten miles per hour for a forty-eight-hour period, drone control program 104 determines that weather conditions do not include a damaging weather condition and the registered object does not presently require protection measures.

Responsive to a determination that a registered object requires protection (YES branch, 206), drone control program 104 deploys drones to relocate the registered object (208). In one embodiment, where a percentage chance of a damaging weather condition occurring at the originating location of the registered object is equal to or greater than the accepted risk level associated with the registered object, drone control program 104 determines to relocate the registered object to the storage location. For example, where a registered object will likely sustain damage by winds exceeding ten miles per hour, and monitored weather conditions indicate a seventy percent chance of winds exceeding twenty miles per hour during a four-hour window in a forty-eight-hour period, drone control program 104 determines that weather conditions include a damaging weather condition and the registered object requires relocation to a storage location. In one embodiment, drone control program 104 determines how many and what type of drones to use to relocate the registered object based on weight and spatial volume properties of the registered object.

Drone control program 104 identifies the registered object at the originating location (210). In one embodiment, drone control program 104 analyzes image information captured through camera 110 on a drone 108 with one or more images of the registered object included in the registered object profile to identify the registered object at the originating location. In one embodiment, drone control program 104 uses computer image processing with an image of the registered object included in the registered object profile to identify the registered object at the originating location. In another embodiment, where drone control program 104 does not find the registered object at the originating location, drone control program 104 searches an area near the originating location and recalls the drone after the drone exhausts a pre-defined amount of energy.

Drone control program 104 moves the registered object to a storage location (212). In one embodiment, drone control program 104 commands one or more drones to secure physical connection with the registered object and transport the registered object to the storage location. For example, the storage location may be a nearby garage, shed, or covered area near the originating location. In another embodiment, the storage location may be a designated storage facility located off-site from the originating location. For example, a designated storage facility may be a commercial storage site located half of a mile away from an originating location.

Drone control program 104 monitors weather conditions at the originating location (214). In one embodiment, drone control program 104 monitors current and future weather conditions at the originating location. In another embodiment, where the storage location is off-site from the originating location, drone control program 104 monitors weather conditions at the originating location and the storage location. In one embodiment, drone control program 104 monitored current and future weather conditions includes information on an estimated start and end time of a weather condition, ambient air temperature, type of precipitation, rate of precipitation, expected accumulation, wind speed, whether lightning is possible, and whether a severe weather condition can occur, such as a flood, tornado, or hurricane. In another embodiment, drone control program 104 monitors weather conditions for all location between the storage location and the originating location, inclusive of originating and storage locations. In one embodiment, drone control program 104 monitors weather conditions at the originating location for changes indicating an abatement of weather conditions that exceeded the risk threshold for the object.

Drone control program 104 determines if conditions are safe for returning the registered object (216). In one embodiment, drone control program 104 analyzes whether a damaging weather condition is present at the storage location. In one embodiment, drone control program 104 analyzes whether a damaging weather condition is present at the originating location. In one embodiment, drone control program 104 determines whether to return the registered object to the registered location by comparing the percentage chance of a damaging weather condition occurring at the originating location to the accepted risk level in the registered object profile. In another embodiment, drone control program 104 retains the registered object at the storage location for a pre-defined period of time and does not analyze weather conditions for the storage and originating locations to determine if the registered object can be returned to the originating location. In one embodiment, drone control program 104 determines whether to return the object to the originating location from the storage location by comparing the accepted risk level in the registered object profile to changes in present weather conditions at the originating location indicating an abatement of weather conditions that exceeded the risk threshold for the object.

Responsive to a determination that conditions are not safe for returning the registered object (NO branch, 216), drone control program 104 continues to monitor weather conditions at the originating location of the registered object (214). In one embodiment, where a percentage chance of a damaging weather condition occurring meets and/or exceeds an accepted risk level in the registered object profile, drone control program 104 determines it is unsafe to return the registered object to the originating location and continues to monitor weather conditions at the originating location. In one embodiment, responsive to a determination that changes in present weather conditions at the originating location indicate no abatement of weather conditions that exceeded the risk threshold for the object, drone control program 104 continues to monitor weather conditions at the originating location for changes in weather conditions at the originating location indicating an abatement of weather conditions that exceed the risk threshold for the object.

Responsive to a determination that conditions are safe for returning the registered object (YES branch, 216), drone control program 104 returns the registered object to the originating location (218). In one embodiment, where a percentage chance of a damaging weather condition occurring fails to meet or exceed an accepted risk level in the registered object profile, drone control program 104 commands a drone to relocate the registered object from the storage location to the originating location. In one embodiment, responsive to a determination that weather conditions are safe for returning the registered object to the originating location, drone control program 104 commands a drone to move to the storage location, secure a physical connection with the registered object and transport the registered object to the originating location. In one embodiment, responsive to a determination that changes in present weather conditions at the originating location indicate an abatement of weather conditions that exceeded the risk threshold for the object, drone control program 104 commands a drone to move to the storage location, secure a physical connection with the registered object and transport the registered object to an originating location.

Drone control program 104 instructs drones to return to a drone home location (220). In one embodiment, drone control program 104 instructs drones to return to a home location, where the home location is a centralized location for drone maintenance and dispatch. For example, in one embodiment, a drone home location might be a facility including a command center, such as command center 102, one or more drones, such as drone 108, one or more battery charging stations for drones, and a designated storage location for registered objects.

Drone control program 104 updates risk assessment and breakability information (222). In one embodiment, drone control program 104 updates risk assessment and breakability information for the registered object by using recorded weather conditions and computer image processing through camera 110 on drone 108 to analyze visual data of the registered object for indication of damage such as cracks, breaks, and missing components occurring after identifying the registered object before relocating to the storage location. In one embodiment, drone control program 104 updates risk assessment and breakability information to include an object damage profile which may include a date, period of time, and location that damage likely occurred, computer image analysis of visual data of the registered object recorded by a camera, such as camera 110 on a drone, such as drone 108 for indicia of damage such as cracks, breaks, dents, scratches, chipping, bending, or missing components. In another embodiment, a person who owns the object may supply the object damage profile information to drone control program 104, including indicia of damage.

Figure 3:
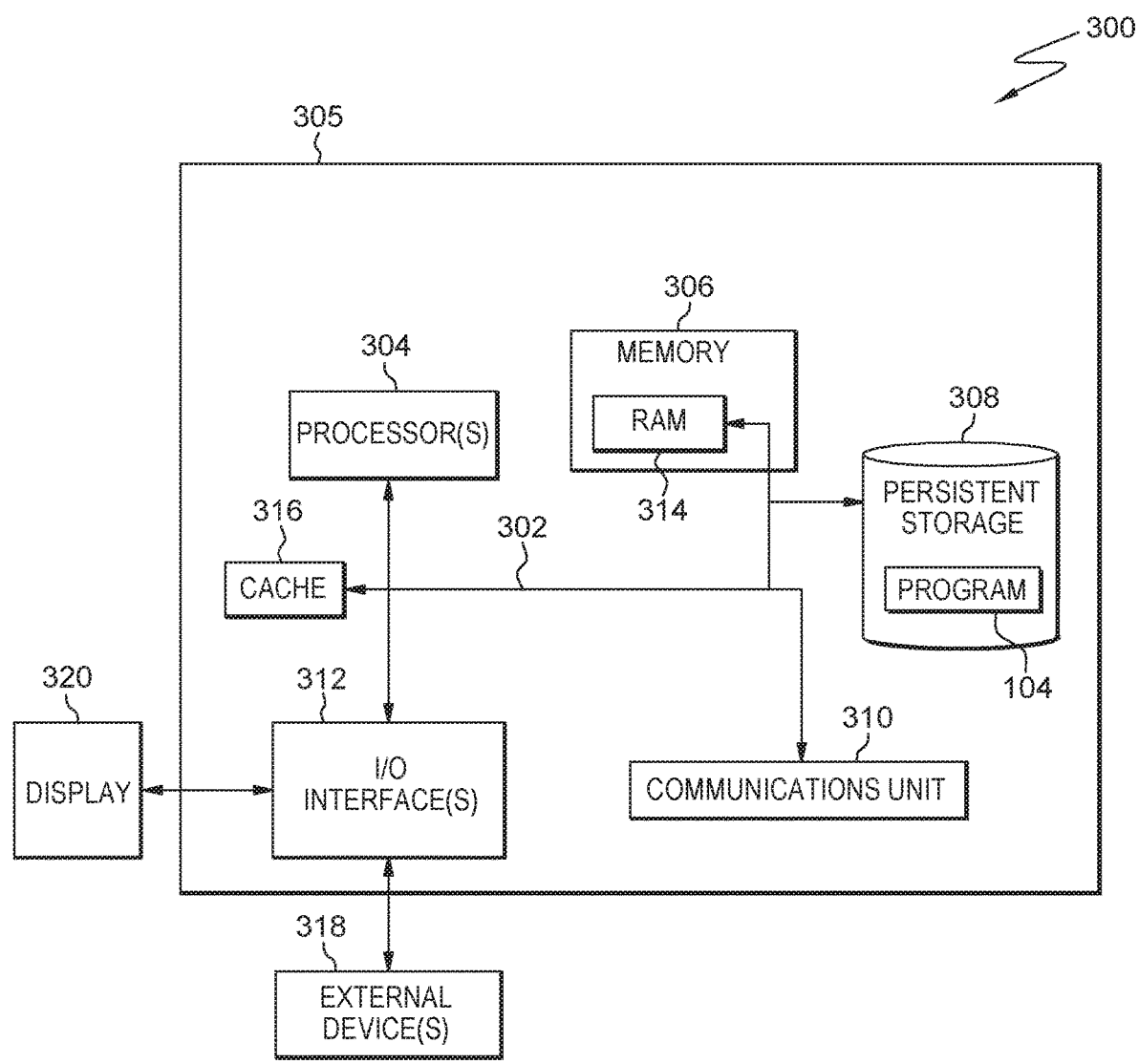
FIG. 3 depicts a block diagram of components of the command center executing the drone control program within the autonomous drone control environment of FIG. 1, in accordance with an embodiment of the present invention.

FIG. 3 depicts a block diagram of components of an autonomous drone control environment, such as command center 102 of FIG. 1, generally designated 300, in accordance with an illustrative embodiment of the present invention. It should be appreciated that FIG. 3 provides only an illustration of one implementation and does not imply any limitations with regard to the environments in which different embodiments can be implemented. Many modifications to the depicted environment can be made.

In the illustrative embodiment, command center 102 in autonomous drone control environment 100 is shown in the form of a general-purpose computing device, such as computer system 305. The components of computer system 305 may include, but are not limited to, one or more processors or processing unit(s) 304, memory 306 and bus 302 that couples various system components including memory 306 to processing unit(s) 304.

Bus 302 represents one or more of any of several types of bus structures, including a memory bus or memory controller, a peripheral bus, an accelerated graphics port and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus.

Computer system 305 typically includes a variety of computer system readable media. Such media may be any available media that is accessible by computer system 305 and it includes both volatile and non-volatile media, removable and non-removable media.

Memory 306 can include computer system readable media in the form of volatile memory, such as random access memory (RAM) 314 and/or cache memory 316. Computer system 305 may further include other removable/non-removable, volatile/non-volatile computer system storage media. By way of example only, storage system 308 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk, such as a CD-ROM, DVD-ROM or other optical media can be provided. In such instances, each can be connected to bus 302 by one or more data media interfaces. As will be further depicted and described below, memory 306 and/or persistent storage 308 may include at least one computer program product having a set (e.g., at least one) of program modules that are configured to carry out the functions of embodiments of the invention.

Program 104, having one or more sets of program modules, may be stored in memory 306 and/or persistent storage 308 by way of example and not limitation, as well as an operating system, one or more application programs, other program modules and program data. Each of the operating systems, one or more application programs, other program modules and program data or some combination thereof, may include an implementation of a networking environment. Program 104 generally carries out the functions and/or methodologies of embodiments of the invention as described herein. Computer system 305 may also communicate with one or more external device(s) 318, such as a keyboard, a pointing device, a display 320, etc. or one or more devices that enable a user to interact with computer system 305 and any devices (e.g., network card, modem, etc.) that enable computer system 305 to communicate with one or more other computing devices. Such communication can occur via Input/Output (I/O) interface(s) 312. Still yet, computer system 305 can communicate with one or more networks, such as a local area network (LAN), a general wide area network (WAN) and/or a public network (e.g., the Internet) via communications unit 310. As depicted, communications unit 310 communicates with the other components of computer system 305 via bus 302. It should be understood that although not shown, other hardware and software components, such as microcode, device drivers, redundant processing units, external disk drive arrays, RAID systems, tape drives and data archival storage systems may be used in conjunction with computer system 305.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for transporting objects responsive to weather data, the method comprising:
   responsive to receiving a registration request, registering, by one or more computer processors, an object and an originating location where the object is currently located;
   monitoring, by the one or more computer processors, a plurality of weather conditions at the originating location;
   determining, by the one or more computer processors, that a risk threshold for the object is exceeded based, at least in part, on the plurality of weather conditions at the originating location and on a plurality of weather condition information for a plurality of similar objects;
   responsive to the determination that the risk threshold for the object is exceeded, instructing, by the one or more computer processors, one or more drones to transport the object from the originating location to a protected location that is protected from the plurality of weather conditions at the originating location and a plurality of weather conditions associated with the plurality of weather condition information for the plurality of similar objects;
   actuating, the one or more drones to transport the object from the originating location to the protected location in accordance with the instructions;
   determining, by the one or more computer processors, that the risk threshold for the object is no longer exceeded based, at least in part, on changes in the plurality of weather conditions indicating an abatement of weather conditions that exceeded the risk threshold for the object;
   responsive to the determination that the risk threshold for the object is no longer exceeded, instructing, by the one or more computer processors, the one or more drones to move the object from the protected location to the originating location; and
   updating, by the one or more computer processors, a risk assessment for the object, based, at least in part, on a damage profile of the object;
   wherein:
      the instructing one or more drones to move the object from the originating location to the protected location further comprises:
         instructing, by the one or more computer processors, the one or more drones to deploy to the originating location; and
         identifying, by the one or more computer processors, the object at the originating location; and
      the identifying the object at the originating location further comprises:
         instructing, by the one or more computer processors, the one or more drones to search near the originating location to locate the object.

* * * * *